Figure 1:
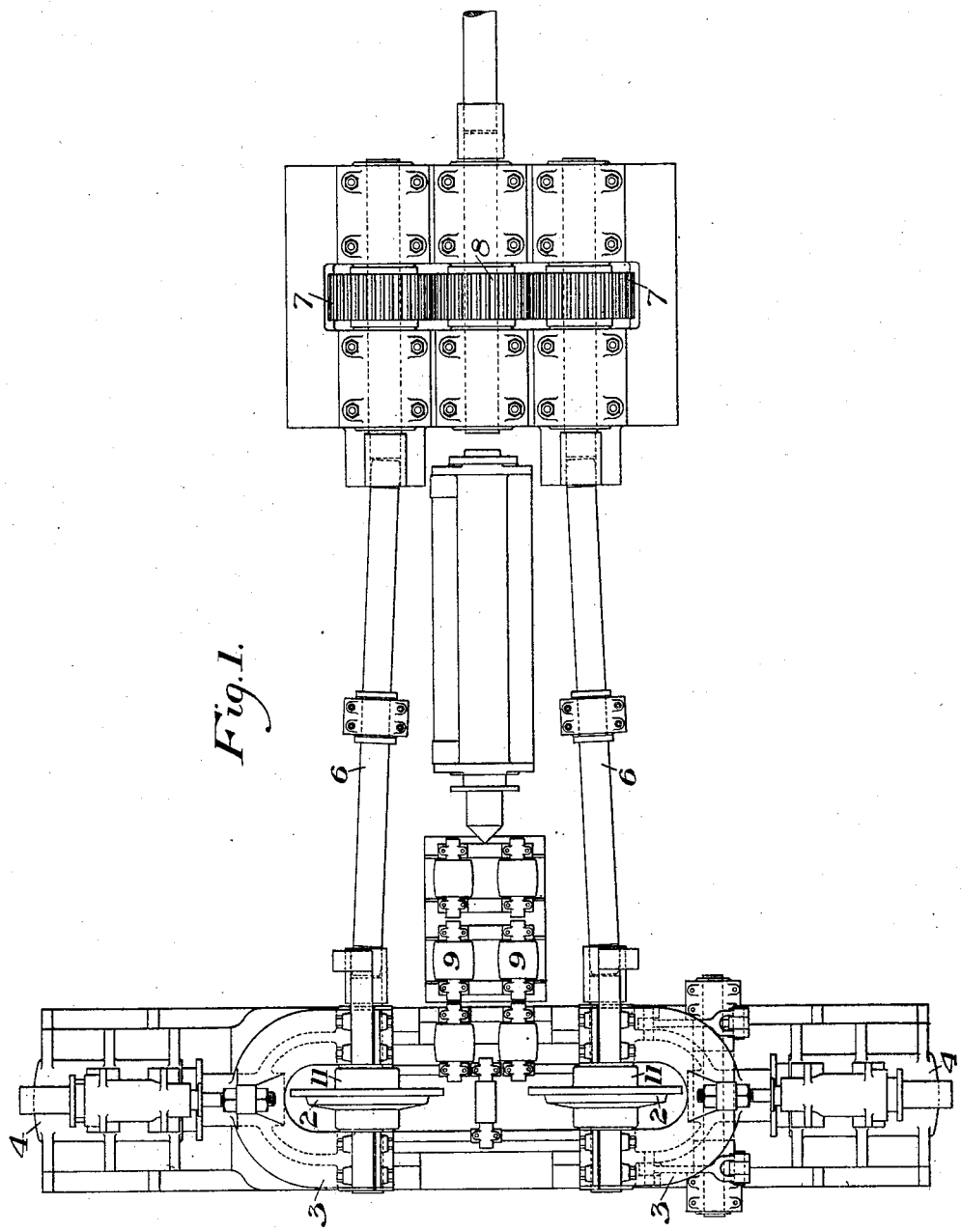

E. E. SLICK.
METHOD OF MAKING WHEELS OR CIRCULAR BODIES HAVING PERIPHERAL TREADS.
APPLICATION FILED JAN. 3, 1907.

965,033.

Patented July 19, 1910.
3 SHEETS—SHEET 1.

WITNESSES

INVENTOR

E. E. SLICK.
METHOD OF MAKING WHEELS OR CIRCULAR BODIES HAVING PERIPHERAL TREADS.
APPLICATION FILED JAN. 3, 1907.
965,033.
Patented July 19, 1910.
3 SHEETS—SHEET 2.
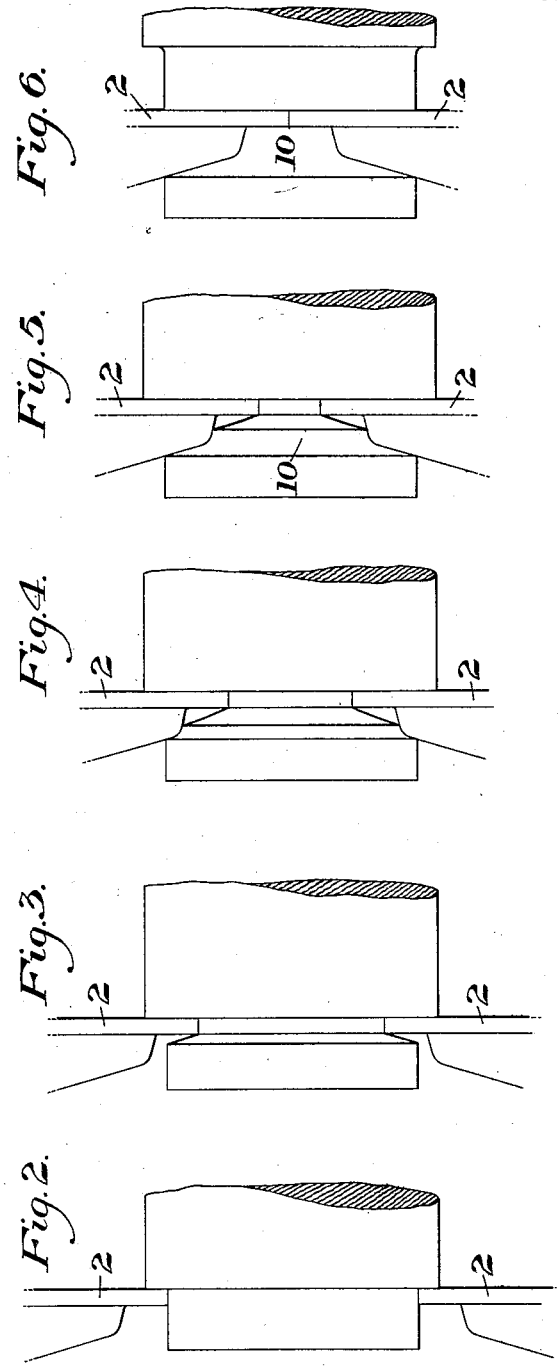

E. E. SLICK.
METHOD OF MAKING WHEELS OR CIRCULAR BODIES HAVING PERIPHERAL TREADS.
APPLICATION FILED JAN. 3, 1907.
965,033.
Patented July 19, 1910.
3 SHEETS—SHEET 3.
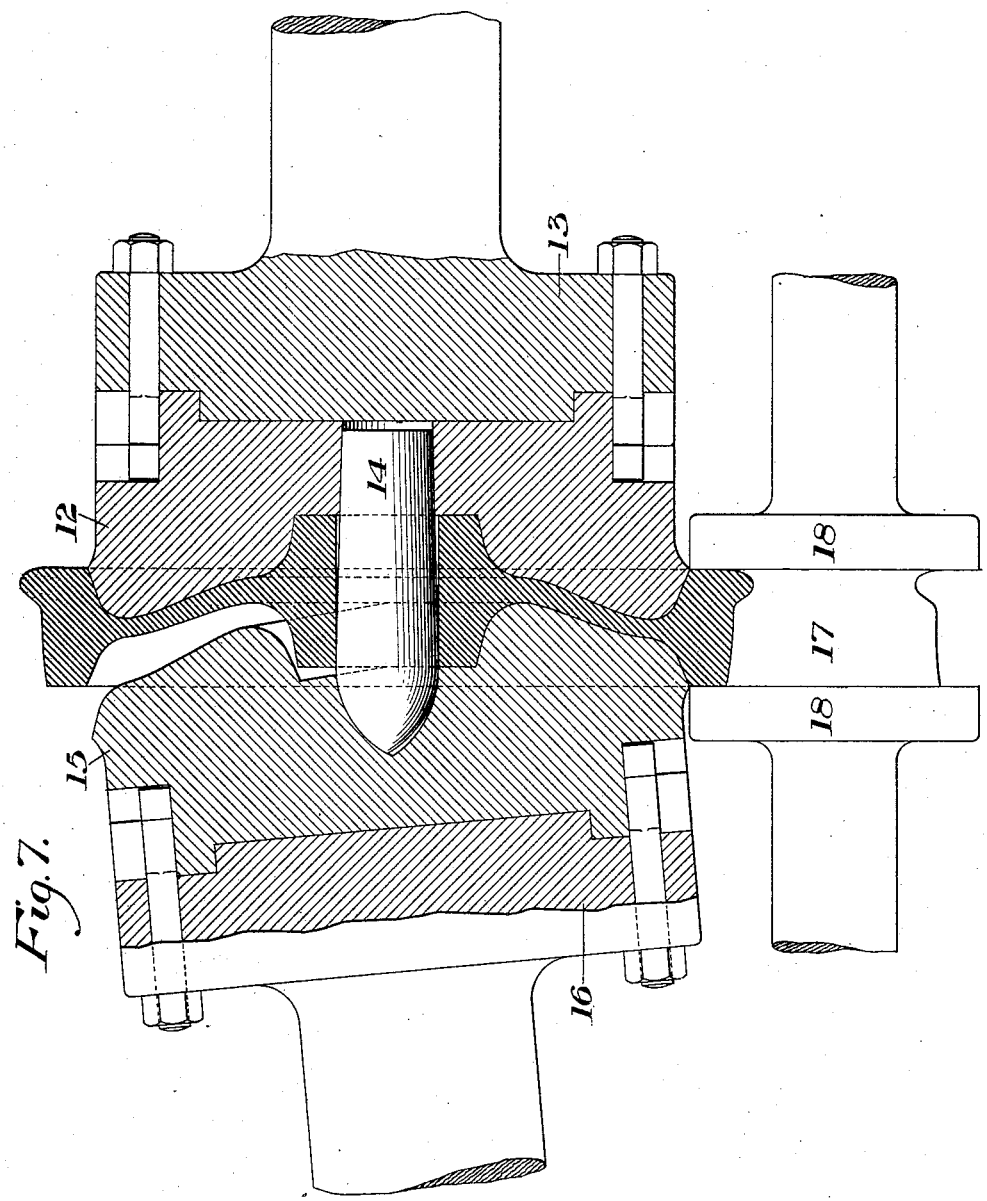
WITNESSES
INVENTOR

UNITED STATES PATENT OFFICE.

EDWIN E. SLICK, OF PITTSBURG, PENNSYLVANIA.

METHOD OF MAKING WHEELS OR CIRCULAR BODIES HAVING PERIPHERAL TREADS.

965,033.      Specification of Letters Patent.      Patented July 19, 1910.

Application filed January 3, 1907. Serial No. 350,607.

*To all whom it may concern:*

Be it known that I, EDWIN E. SLICK, of Pittsburg, Allegheny county, Pennsylvania, have invented a new and useful Method of Making Wheels or Circular Bodies Having Peripheral Treads, of which the following is a full, clear, and exact description, reference being had to the accompanying drawings, forming part of this specification, in which—

Figure 1 is a plan view of the rotary shear mechanism which I prefer to employ in my process; Figs. 2, 3, 4, 5 and 6 show the different positions of the shear blades in the act of cutting the ingot; and Fig. 7 is a side elevation of the improved forging and rolling apparatus which I prefer to employ.

My invention relates to the manufacture of blanks to be formed into wheels or tires.

Heretofore in the manufacture of railroad tires, cheese-shaped blanks have been cast in groups, each blank forming a single tire. These blanks are hammered, punched, beaked, and then finished on a tire rolling mill.

In the manufacture of steel wheels, the blanks used have either been cast, one for each wheel, or have been cut or forged from a slab, one being used for each wheel. In all of these methods there has been a large scrap loss, this resulting from the metal in the runners and gates for the tire blanks or cast blanks for the wheels, and from the amount cut off in rolling and shaping the slabs.

My invention is designed to overcome or greatly reduce scrap losses, and provide a simple, cheap method for obtaining the blanks, which will also give an improved blank for the purpose.

In carrying out my process, I first cast a solid steel ingot of substantially cylindrical form which may, if desired, taper slightly through one end toward the other for ease in drawing from its mold. This ingot is taken from the mold, reheated and hot sheared transversely to produce a series of cheese-shaped blanks, each one of which may be used for forming the wheel or tire. This shearing operation is preferably carried out by the rotary shears shown in Fig. 1, in which 2, 2 are the shear blades carried in shafts mounted in bearings on the cross-heads 3, 3, which are moved to and from each other simultaneously by hydraulic cylinders 4, 4. The shear blades are positively rotated by wabbler connections 6 to pinions 7 actuated by the intermediate pinion 8. The hot ingot is supported in any suitable manner to allow rotation, as for example, on the sets of rollers 9, 9. The successive positions of the shear blades as they are forced in, and the successive shapes of the metal in the blank and adjacent portions of the ingot are illustrated in Figs. 2 to 6, inclusive. It will be noted that as shown in these figures, the shears not only cut off the blank and partially shape its hub portion 10, but shaping collars 11 on the shafts of the shears also size the next portion of the ingot which forms the next blank. This sizing of the next successive blank may or may not be used, as desired, in connection with the cutting off operation, and the blanks may merely cut off without attempting to shape the hub portion at all, though I prefer to do this, as it saves work in the after steps. The blanks thus formed may be punched for the central hole either before cutting off, during cutting off, or after cutting off from the ingot. These blanks may then be worked into the wheels or tires by any suitable steps, one form of apparatus for the making of wheels being set forth and described in my copending application No. 346,420, filed December 5, 1906, and shown in Fig. 7. In this apparatus, the cut-off blank which may be of a sufficiently high temperature after cutting off, or which may be passed through a reheating furnace, is forged or rolled to increase its diameter, and the edge portion is rolled into the tread and flange shape desired, in the form shown. The flange and tread portion may, however, be formed into shape by the dies themselves, one of which would then be made in the form of a matrix die.

In Fig. 7, where one form of apparatus for forging wheels is shown, 12 represents a circular forging die removably secured to a head 13 which may be formed as part of a hydraulic plunger, a screw, or a shaft supported in stationary bearings. This die may be provided with a central punch or pin 14 by which the blank may be centered to the hole formed in the hub; or it may be employed without any such punch, and the punching may be carried out either before or after this operation. In either case, the die 12 is rotatably mounted. The opposite die 15 is rotatably mounted with its axis at a slight angle to the axis of the die 12, and its inner forming face is properly shaped so that at one side it will properly coact with the die 12 to forge and press the metal of the web and hub to the desired shape. The die 15 also is preferably removably secured on a head or support 16 which may be carried on a rotary stem or a hydraulic plunger or other suitable carrier.

One or both of the dies may be employed to carry out the forging operation, and for this purpose may be forced toward the other die by a hydraulic cylinder, by a screw, a wedge mechanism, or any suitable device for carrying sufficient pressure thereto to carry out the forging operation. Pressure may be applied to both dies if desired. I prefer to positively rotate both dies during the forging operation through suitable gearing or driving connections. One of the dies may, however, be rotated by friction with the metal operated upon.

17 is a grooved-forming roller having collars 18, 18 with the body between the collars, and suitably shaped to give the desired form to the rim portion of the wheel. The form of this roller may be varied in many ways without departing from my invention, for example, the dies 12 and 15 may be extended outwardly to inclose or partially inclose the metal acted upon by the roller; and the shape of the roller and the dies may be varied in many ways in this regard.

The roller 17 is rotatably mounted in suitable bearings, and these bearings may be adjusted to bring the roll closer to or farther from the dies. The bearings may also be carried on an adjustable support or carrier, and this support or carrier may be provided with a pressure device such as a hydraulic cylinder, a screw, or other means for forcing the roller toward the dies. This pressure device is not necessary however, for the roller inasmuch as the forging pressure on the die or dies forces the metal outwardly against the shaping roller.

In carrying out my process, the steel blank which may be either cast or of forged metal, or formed from a rolled slab, and either solid or punched at the center, is placed between the dies, one of which is retracted for this purpose. Pressure is then applied to the support or carrier of one or both of the dies, and the driving connections start the dies into rotation. The pressure applied to the die or dies is made sufficient to reduce the web portion and shape the hub, the metal being elongated radially during this reduction, and thus forced outwardly against the forming roller. As the operation continues, the web becomes reduced in thickness, and the metal is forced out into the tread and flange portions to shape them by the forming roller.

A desirable form of apparatus for forming the blanks into tires is shown in my copending application for a method of and apparatus for rolling hollow metal bodies, Serial No. 522,730, filed October 15, 1909, and in forming tires with the apparatus shown therein, the blank is preferably punched after the shearing operation and before the forging operation is started.

A punch may be used on one of the dies which will partly punch the hole in the hub during the forging operation; or the blank may be previously punched, in which case the pin 14 may be employed to center the blank during the forging and rolling operation; or the punch may be done away with, and the blank may be punched after the rolling and forging operation.

The ingot may be cast of large diameter, so that little or no increase of diameter may be necessary in shaping the blank. I may also in such case shear the blanks so thin that little or no radial flow of the metal is required in the subsequent operation. This might occur in the case of heavy wheels.

The ingot may be rolled or forged to form a bloom before it is transversely severed.

The advantages of my invention result from doing away with the scrap loss caused by shearing off the blanks from a cast ingot, and also from the high quality of metal obtained in the flange and tread portions, owing to these portions being formed from the exterior concentric parts of the cast ingot. Any segregation which may take place in the ingot will be symmetrical from the center outwardly, and will occur mainly in the central portion and at the top.

Many changes may be made in the form and arrangement of the molds, the hot shearing device, and the apparatus for finishing the blanks into tires or wheels, without departing from my invention.

I claim:—

1. The method of forming metal blanks, consisting in hot-shearing an ingot or bloom transversely and reducing the cross-section of the adjoining portion of the ingot or bloom preparatory to the next shearing operation, and subsequently performing like operations upon successive portions thereof to form other blanks; substantially as described.

2. In the manufacture of wheels, the steps consisting of hot shearing an ingot or bloom by applying cutting forces to the opposite outer faces of the blank, forming the central part of the blank into a centering portion, then centering the blank in a die and shaping it, substantially as described.

3. In the manufacture of circular bodies having a peripheral tread, the steps consisting in forming a solid ingot or bloom having a length equal to at least three blanks, successively hot shearing the ingot or bloom into blanks by forcing at least one cutting face toward the axis of the ingot sufficiently to sever therefrom a blank, and simultaneously therewith reducing the portion of the ingot or bloom adjacent to the portion being severed to partially form another blank; substantially as described.

4. In the manufacture of circular bodies having a peripheral tread, the steps consisting in forming a blank by rotating an ingot and simultaneously hot-shearing it by cutting forces applied to the opposite outer faces thereof, forming a centering portion during the cutting operation, then centering the blanks between coacting die surfaces and finally finishing the blanks into wheels or tires by reducing the thickness and displacing the metal radially outward to increase the diameter of the blank; substantially as described.

5. In the manufacture of circular bodies having a peripheral tread, the steps consisting in hot-shearing the ingot or bloom transversely into blanks, reducing the diameter of a portion of the ingot simultaneously with the shearing operation, centering the blanks sheared from the partially reduced ingot between coacting die surfaces, and finishing the blank therein into tires or wheels by reducing the thickness and forcing the metal radially outward between the coacting die surfaces; substantially as described.

6. In the manufacture of substantially circular blanks for wheels or similar objects, the steps consisting in taking an ingot severing the same transversely and simultaneously shaping the blank with its central portion thicker than its outer portions; substantially as described.

7. In the manufacture of circular bodies having a peripheral tread, the steps consisting of hot shearing an ingot or bloom transversely, simultaneously reducing the diameter of the adjoining portion of the ingot or bloom preparatory to the next shearing operation, and finishing the blank into tires or wheels, substantially as described.

8. In the manufacture of circular bodies having a peripheral tread from ingots or blooms, the steps consisting in sizing at least a portion of the ingot or bloom so as to give the sized portion a certain cross sectional shape and size, and then severing transversely from the sized portion a predetermined blank which is adapted to be formed into a wheel or tire; substantially as described.

9. In the manufacture of circular bodies having a peripheral tread from a tapered ingot, the steps consisting in reducing at least a portion of the ingot to a uniform cross sectional shape and size, then severing transversely from the sized portion of the ingot a predetermined blank which is adapted to be formed into a wheel or tire; substantially as described.

10. In the manufacture of circular bodies having a peripheral tread, the steps consisting of successively reducing portions of a tapered steel ingot to a substantially cylindrical uniform size, hot-shearing the reduced portions of the ingot into blanks, and working said blanks into wheels or tires; substantially as described.

11. In the manufacture of circular bodies having a peripheral tread, the steps consisting of reducing successive sections of a steel ingot to substantially the same diameter and length, cutting off said sections, and working them into wheels or tires; substantially as described.

12. In the manufacture of circular bodies having a peripheral tread from a solid ingot or bloom, the steps which consist in reducing the cross sectional area of a portion at least of the metal and densifying the metal therein by forging pressure applied transversely to the axis of the ingot upon successive peripheral portions thereof, transversely severing a portion of the reduced and densified portions to form a blank, and subsequently forming a wheel or tire from the severed blank; substantially as described.

13. In the manufacture of substantially circular blanks for wheels or similar objects, the steps consisting in taking an ingot, reducing the same to substantially uniform cross-sectional area, severing the same transversely and simultaneously shaping the blank with a centrally thickened portion; substantially as described.

14. In the manufacture of wheels, the taking of an ingot and severing transversely therefrom a blank and simultaneously forming a projection on the severed face thereof; substantially as described.

15. In the manufacture of circular bodies having a peripheral tread, the steps consisting of taking a steel ingot, sizing at least a portion of the ingot to give a certain cross sectional shape and size, shearing the sized portion of the ingot transversely into blanks and expanding the sheared blanks into wheels or tires; substantially as described.

16. In the manufacture of circular bodies having a peripheral tread from a solid cast ingot or bloom, the steps which consist in reducing the cross-sectional area of a portion at least of the metal and densifying the metal therein by transversely rolling, transversely severing a portion of the reduced and densified ingot to form a blank, and subsequently forming a wheel or tire from the severed blank; substantially as described.

17. In the manufacture of circular bodies having a peripheral tread from a solid cast ingot, the steps which consist in reducing the cross-sectional area and densifying the metal in the ingot by rolling, transversely severing the reduced and densified ingot into portions forming blanks, and subsequently forming the severed blanks into wheels or tires; substantially as described.

18. The method of making circular articles, consisting in taking an ingot, severing transversely therefrom a blank having its peripheral surface formed of the peripheral surface of the cast ingot, and having a greater thickness at its central portion than at its surrounding portion, and spreading and shaping the blank; substantially as described.

In testimony whereof, I have hereunto set my hand.

EDWIN E. SLICK.

Witnesses:
R. D. LITTLE,
H. M. CORWIN.